Sept. 2, 1958 J. C. M. FROST 2,850,083
CELLULAR FUEL TANK

Filed Oct. 8, 1952 2 Sheets-Sheet 1

INVENTOR
JOHN C. M. FROST
BY

ATTORNEY.

Sept. 2, 1958 J. C. M. FROST 2,850,083
CELLULAR FUEL TANK
Filed Oct. 8, 1952 2 Sheets-Sheet 2

INVENTOR
JOHN C. M. FROST
BY
ATTORNEY.

United States Patent Office 2,850,083
Patented Sept. 2, 1958

2,850,083

CELLULAR FUEL TANK

John Carver Meadows Frost, Georgetown, Ontario, Canada, assignor to A. V. Roe Canada Limited, Malton, Ontario, Canada, a corporation Application October 8, 1952, Serial No. 313,745

5 Claims. (Cl. 158—46)

This invention relates to tanks for containing liquid fuel and is primarily though not exclusively concerned with fuel tanks for military aircraft.

Aircraft in flight are subject to frequent changes of altitude and in certain manoeuvres are subject to conditions known as "negative $g$" conditions, in which accelerations are applied to the aircraft and their contents in a sense opposite to the direction of the normal gravitational forces experienced in straight and level flight. In such circumstances liquid fuel contained in tanks in the aircraft may surge away from the tank outlets, and many arrangements of horizontal and vertical baffles have been devised to retain at least a small quantity of fuel in the neighborhood of the outlets, to ensure a constant supply to the engines. Furthermore, booster pumps are frequently fitted at tank outlets to provide a positive feed from the tanks to the engines as a precaution against starvation of the engines due to accelerations applied to the fuel in the pipe-lines during aircraft manoeuvres. The provision of such baffles and booster pumps imposes a weight penalty on the aircraft and introduces undesirable complications of manufacture and maintenance.

The contents of aircraft fuel tanks are very easily ignited, since in the space unoccupied by fuel there exists a mixture of fuel vapour and air which is usually highly combustible. Only when the tanks are almost full of fuel is this mixture likely to be too rich to ignite in the presence of a spark or flame. To mitigate this risk it is common, in military aircraft at least, to dispense with the normal air vents and to apply an inert gas, usually nitrogen, to the tanks, so that the space unoccupied by fuel is filled with an incombustible gas. This process is known as "purging" and adds considerable weight and complication to the aircraft in the provision of the necessary pipelines, gas cylinders, and associated valves.

Another danger to military aircraft, and to military vehicles of all sorts, is explosion of fuel tanks on being hit by bullets or similar projectiles. The kinetic energy of a bullet piercing the tank, during its passage through the fuel, is absorbed to a large extent by the fuel, generating hydraulic shock waves of a sufficient intensity to cause complete disintegration of the tank. When the tank is an integral part of an aircraft structure such as a wing, it will be appreciated that such disintegration can be disastrous. The provision of baffles may effect some absorption of hydraulic shock but such baffles add weight to the structure and are seldom adequate to prevent failure of the tank.

Furthermore, since the boiling point of a liquid is lowered by reduction of pressure, considerable loss of fuel due to boiling may be experienced in aircraft flying at high altitudes, particularly after a rapid climb when the fuel is still warm from conditions at a lower altitude, unless the tanks or containers in which the fuel is carried are subject to artificial pressurization. Such pressurization imposes bursting loads on the tank structure which must be reinforced or braced to withstand the unbalanced internal pressure; such reinforcement is again a source of additional weight.

An important object of the invention is to reduce the movement of the fuel in an aircraft fuel tank, due to "negative $g$" conditions or manoeuvres of the aircraft, which would tend to starve the tank outlet, and to eliminate the need for booster pumps to ensure a positive supply of fuel to the engines.

Another object of the invention is to render a fuel tank proof against complete ignition, due to a spark, flame, or incendiary bullet introduced to the space unoccupied by fuel, without the provision of purging equipment.

A further object of the invention is the elimination of fuel tank failure from hydraulic shock, when pierced by a bullet or similar projectile or fragment thereof.

A still further object of the invention is to provide a tank structure which while achieving the objects aforesaid will withstand a high degree of pressurization without recourse to heavy gauge material or special bracing.

Other objects and advantages will be apparent from the following description of a preferred application of the invention to the fuel tanks of an aircraft.

According to the invention, a tank for containing liquid fuel comprises a plurality of interconnected slender cells disposed substantially vertically when the tank is upright, the tank having an inlet whereby fuel may be admitted to the cells and an outlet whereby the fuel may be withdrawn from the lower ends of the cells, and the cells having such cross-sectional internal dimensions that when the cells have in their lower ends fuel of the kind for which the tank is designed they retain the fuel in the said lower ends when the tank is inverted.

According to another feature of the invention, the cells have interconnections at their upper ends, the cross-sectional area of the interconnections and the relationship between the internal cross-sectional area and the length of each cell being such as to dampen the propagation of flame from cell to cell.

It has heretofore been proposed to provide pipes or cells in fuel tanks. These pipes or cells act as baffles and may to a certain extent tend to suppress hydraulic shock. However it has not previously been recognized that a cellular fuel tank can be so constructed as to overcome "negative $g$" problems and to dampen the propagation of flame, as well as to minimize hydraulic shock and provide a structure which can be highly pressurized without resorting to auxiliary equipment or heavy structural members.

In the accompanying drawings, in which like reference characters designate like parts throughout the several views.

Figure 1:
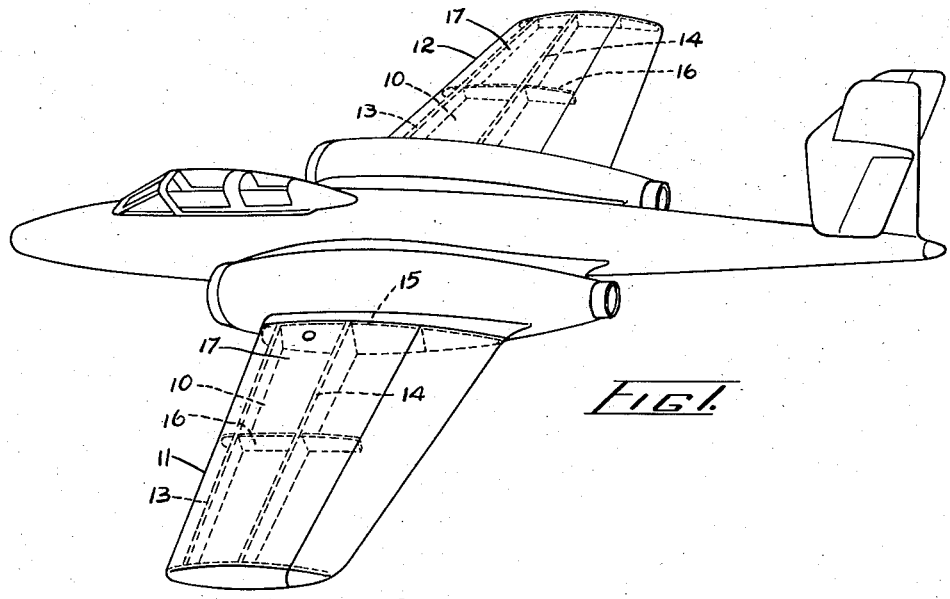
Fig. 1 is a perspective view of an aircraft having in its wings fuel tanks constructed in accordance with this invention.
Figure 2:
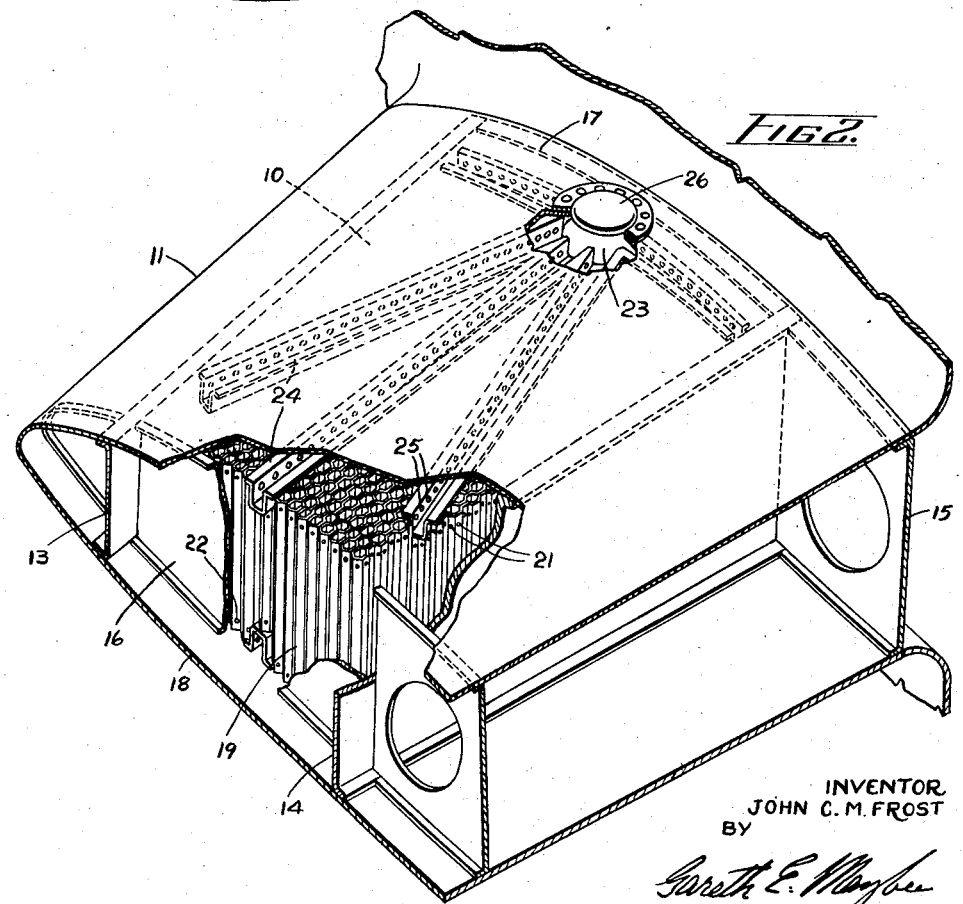
Fig. 2 is an enlarged fragmentary top perspective view of a portion of one wing showing details of a fuel tank.

The aircraft shown in Fig. 1 has a fuel tank 10 in each of the wings 11 and 12, each tank being an integral part of the wing structure and being defined by the inboard portion of a front spar 13, the inboard portion of a rear spar 14, inboard and outboard ribs 15 and 16 respectively, and upper and lower wing skins 17 and 18 respectively. As indicated in Fig. 2, each tank is completely filled with a fine honeycomb structure 19 of vertically disposed cells.

Figure 4:
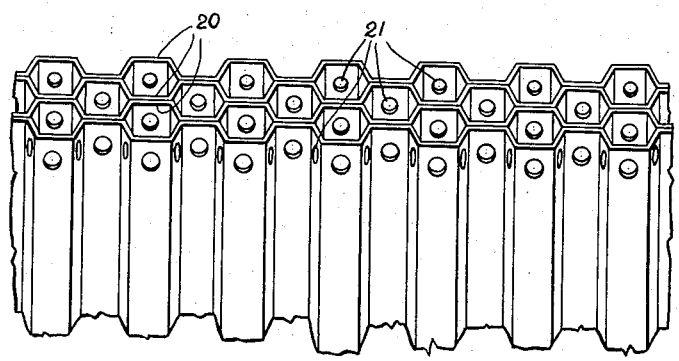
Fig. 4 is an enlarged view of an upper portion of the internal honeycomb structure of the tank.

The honeycomb structure 19 comprises a plurality of corrugated walls 20 (Fig. 4) arranged to define slender cells or columns of hexagonal cross-section. The walls 20 are of thin, resilient, plastic-impregnated fibreglass fabric, bonded together along their areas of contact, and bonded by a suitable adhesive along their upper and lower edges to the upper and lower skins 17 and 18 by any one of several known methods. The individual cells are thus completely sealed at their top and bottom extremities, but adjacent cells are interconnected by small vents or passages 21 in the walls at each upper extremity, and holes 22 at each lower extremity.

For filling the tank, a filler compartment 23 is provided at the top of the tank, and from the filler compartment a plurality of channels or conduits 24 radiate across the top of the tank. The honeycomb structure 19 is routed or similarly machined to receive the channels 24 which are bonded in position by one of several well known methods. Each channel has a plurality of perforations 25 in its vertical sides. The compartment 23 is located under a port in the upper skin 17, the port being sealed by a cap 26 which can be removed for filling the tank with fuel: fuel flows into the compartment 23, along the channels 24, and through the perforations 25 into the honeycomb structure.

Figure 3:
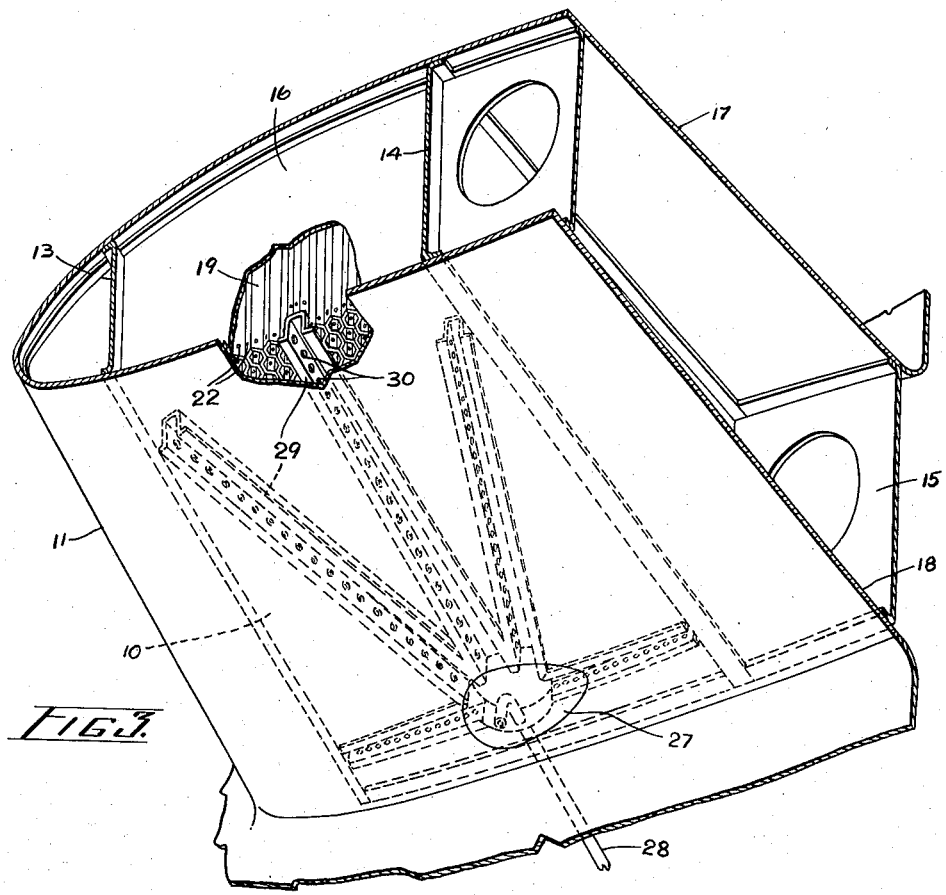
Fig. 3 is a bottom perspective view similar to Fig. 2.

As shown in Fig. 3, a sump 27, in which a tank outlet pipe 28 is situated, is provided in the lower skin 18. A plurality of channels 29 radiate from the sump across the bottom of the tank, each channel being of rectangular cross-section and having perforations 30 in its vertical sides whereby fuel passes into the channel from the honeycomb structure. From the channels 29 the fuel runs into the sump 27 from which it is delivered by the pipe 28 to the aircraft engine. The cross-sectional area of each channel 24, 29 decreases in accordance with its distance from the compartment 23 or sump 27.

The channels 24 are connected to a port (not shown) through which air is admitted to the tank as the fuel is used. The port is connected to a source of air pressure, such as a bleed in the air compressor of a gas turbine engine, affording a positive pressure in the entire fuel system in all circumstances. The attachment of the walls 20 of the honeycomb structure to the upper and lower skins 17 and 18 of the tank provides a uniformly distributed tie between the skins, so that a high degree of pressurization can be achieved without causing distortion.

The internal cross-sectional dimensions of each cell (i. e. the internal cross-sectional area of each cell, and the internal shape of the cell) are so related to the physical characteristics of the fuel that if the cell were sealed at the bottom and open at the top it would retain the fuel when inverted, after the manner of a pipette. While the cells have the small holes 22 interconnecting their lower ends, the lower ends are effectively sealed by the liquid fuel which they contain, the fuel providing a mutual hydraulic lock between cells. Thus, under conditions of unit "negative $g$" the fuel is retained in the cells and is not transferred to the upper regions of the tank; it is recognized that in flight values of "negative $g$" greater than unity may be encountered for short periods, but such conditions are unlikely to be of sufficient duration to cause starvation of the engine. Thus, during manoeuvres of the aircraft, fuel, under pressure, is retained in the bottom of the tank and in the tank outlet 27 and in the supply line 28 to the engine. No booster pump and no arrangement of horizontal and vertical baffles around the outlet are required.

The cell dimensions required to achieve this "pipette effect" depend on factors such as the viscosity and surface tension of the fuel, and the surface condition and finish of the cell walls, and, as mentioned above, the internal shape and the internal cross-sectional area of the cells are important. By way of example, the "pipette" effect has been achieved with hexagonal cells having walls of the aforementioned plastic-impregnated fibreglass fabric and an internal cross-sectional area of 0.05 sq. in., using gasoline (petrol) as the fuel. The cells must be sufficiently large in cross-section to permit the fuel to flow out of the cells to the outlet: however capillary action in the cells tending to prevent the fuel from draining to the tank outlet can be overcome by pressurizing the tank, so that the internal cross-sectional area of the cells may be very small indeed.

As in all fuel tanks, as fuel is removed from the outlet the level of liquid fuel in the tank falls, and above the liquid fuel there is a gaseous mixture consisting of fuel vapour and air. In a conventional tank there is a great danger that the entire gaseous mixture will be ignited if the tank is struck by an incendiary bullet. However in a tank such as the one illustrated in the drawings the gaseous mixture is separated into a number of columns, and it has been found that if the cross-sectional dimensions of the cells are such as to achieve the "pipette effect" mentioned above, then in tanks having cells of such lengths as are likely to be used in ordinary aircraft practice combustion caused by the ignition of the gaseous mixture in one cell is damped out before it can spread to cells that are not in the immediate vicinity. The factors that affect the spread of combustion from cell to cell are believed to be the internal cross-sectional area of the cells, the distance between the holes 21 and 22 (i. e. the length of the cells, since the holes are at the ends of the cells), and the size of the holes 21. It has been found in practice that, for aircraft fuel tanks, a honeycomb structure having hexagonal cells each of cross-sectional area of 0.05 sq. in. and a length of 8 inches, interconnected by holes 21 of $\frac{1}{16}$ in. diameter, is satisfactory. The "fineness ratio," that is, the ratio of the cross-sectional area of a cell to the square of the length of the cell, is an important factor of the flame damping characteristics of the tank. It has been found by experiment that effective flame damping can be achieved with a fineness ratio of 1:50, though it is believed that this is approximately the maximum figure for reliable results. Though the phenomenon is not fully understood, it is thought that the flame damping properties of the honeycomb structure are due in part to the elongated configuration of each cell, preventing turbulence and convection of the gaseous mixture, which would normally take place in a less confined space. Each cell contains an air and fuel vapour mixture which is too rich to ignite adjacent the surface of the liquid fuel, too lean to ignite remote from the said surface, and is readily combustible only in a relatively small region between the two extremes: the slenderness or fineness of the column of gas tends to restrict intermingling so that the combustible mixture is substantially isolated between the lean mixture and the rich mixture. Furthermore, it is thought that the readily combustible mixture is in so small a quantity as to be unable to generate sufficient force to shatter the resilient walls 20 of the cell or to overcome the restriction imposed by the small interconnecting holes 21 before the energy released by its combustion is spent.

As mentioned hereinbefore, it has been found that if the cross-sectional dimensions of the cells are such as to achieve the "pipette effect" then in tanks having cells of such lengths as are likely to be used in ordinary aircraft practice accidental combustion in one cell is damped out before it can spread throughout the tank. It should not be assumed however that such flame damping properties are contingent upon the "pipette effect": the flame damping properties appear to depend primarily upon the "fineness ratio" and may be achieved in tanks having cells of cross-sectional dimension which are too large to sustain the "pipette effect," provided that such cells are of sufficient length.

If the tank is hit by an incendiary bullet which passes through the space unoccupied by liquid fuel, it is probable that the mixture of air and fuel vapour in the cells traversed by the bullet will ignite. However due to the fact that the gas is contained in relatively slender columns interconnected only at their upper ends through the small holes 21 in the cell walls, combustion will not spread throughout the tank but will be extinguished after extending only to the undamaged cells immediately adjacent the passage of the bullet.

A bullet passing through the space in the tank occupied by fuel will generate hydraulic shock waves in the liquid, but by virtue of the multiplicity of cells any such waves will be absorbed by the cell walls before they can cause serious damage to the main tank structure. The damage to the honeycomb structure will extend over a few cells on both sides of the passage of the bullet, the extent depending upon the calibre of the bullet, but the more remote structure will not sustain any damage.

Since the liquid fuel in the tank is in effect divided into a large number of vertical columns, interconnected only at their lower ends by small holes 22, any surging of fuel in the tank due to the manoeuvres of the aircraft is virtually eliminated and by virtue of the small cross-sectional area of each cell the fuel does not tend to be transferred to the upper regions of the tank under conditions of "negative g," but is retained in the lower part of the tank by the aforementioned pipette effect. Thus in all manoeuvres of the aircraft, fuel, under pressure, is retained in the bottom of the tank and in the tank outlet 27 and in the supply line 28 to the engine. For this reason, no booster pump and no arrangement of horizontal and vertical baffles around the outlet are required.

The provision of the honeycomb structure within the tank eliminates the necessity for baffles such as are customarily required in the manufacture of tanks for use in aircraft so that the entire assembly can be made as light as a tank constructed in accordance with normal practice. In addition the honeycomb structure provides both compressive and tensile support, and the uniform distribution of this support is of great benefit for pressurization purposes, so that a high degree of pressurization is possible, effectively eliminating boiling of the fuel, which is a serious source of fuel loss in aircraft flying at high altitude, as hereinbefore mentioned.

It is to be understood that the form of the invention herewith shown and described is to be taken as a preferred example of the same and that various changes in the shape, size, and, arrangement of the parts, for example, in the geometrical cross-sectional shape of the honeycomb cells may be resorted to without departing from the scope of the subjoined claims. In the claims the term "fluid" is used in its generic sense as including both liquids and gases, and in this connection it is to be noted that, for the tank to demonstrate the "pipette" effect, the cells provide the only paths for fluid flow between the top and bottom parts of the tank whereby the mutual hydraulic lock hereinbefore referred to is maintained.

What I claim as my invention is:

1. A tank for liquid fuel comprising, a casing, partitions in said casing, the majority of said partitions extending to the upper and lower inner surfaces of said casing and dividing the interior thereof into a plurality of slender cells extending vertically when said tank is upright, openings through said partitions near the upper and lower ends of all of said cells and constituting the only fluid flow passages between adjacent cells, the internal cross-sectional area of each of said cells being not more than 0.05 square inch and the area of each of said openings being substantially less than said cross-sectional areas of said cells, passage defining means communicating with the upper ends of some of said cells for the filling of said tank with fuel, and outlet means communicating with the lower ends of some of said cells for withdrawing fuel from said tank, said cells comprising the only fluid flow path between said passage defining means and said outlet means and functioning as pipettes to retain liquid fuel at said lower ends even when said tank is inverted.

2. A tank as defined in claim 1 wherein said passage defining means and said outlet means comprise channel members having openings therein communicating with the upper and lower ends, respectively, of said some of said cells.

3. A tank as defined in claim 1 wherein said passage defining means and said outlet means comprise channel members having openings therein communicating with the upper and lower ends, respectively, of said some of said cells, said channel members extending along the upper and lower inner surfaces, respectively, of said casing.

4. A tank as defined in claim 1 wherein the said cross-sectional area of each of said cells is not materially greater than $\frac{1}{50}$ of the square of the distance between said upper and lower openings.

5. A tank as defined in claim 1 wherein the upper and lower edges of said majority of said partitions are, respectively, bonded to the upper and lower inner surfaces of said casing.

References Cited in the file of this patent

UNITED STATES PATENTS

| | | |
|---|---|---|
| 1,591,618 | Foulk | July 6, 1926 |
| 2,305,923 | Held | Dec. 22, 1942 |
| 2,609,068 | Pajak | Sept. 2, 1952 |